(12) United States Patent
Pourchet et al.

(10) Patent No.: US 12,015,323 B2
(45) Date of Patent: Jun. 18, 2024

(54) STATOR COOLING HOUSING FOR A STATOR OF A ROTARY ELECTRIC MOTOR

(71) Applicant: ETEL S.A., Motiers (CH)

(72) Inventors: Johann Pourchet, La Chaux de Gilley (FR); Dmitry Chechenev, Neuchatel (CH); Ivan Garcia-Herreros, St-Sulpice (CH)

(73) Assignee: ETEL S.A., Motiers (CH)

( * ) Notice: Subject to any disclaimer, the term of this patent is extended or adjusted under 35 U.S.C. 154(b) by 155 days.

(21) Appl. No.: 17/535,594

(22) Filed: Nov. 25, 2021

(65) Prior Publication Data

US 2022/0190674 A1 Jun. 16, 2022

(30) Foreign Application Priority Data

Dec. 10, 2020 (EP) .................................... 20213038

(51) Int. Cl.
*H02K 5/20* (2006.01)
*H02K 9/00* (2006.01)
(Continued)

(52) U.S. Cl.
CPC .............. *H02K 5/20* (2013.01); *H02K 5/203* (2021.01); *H02K 9/00* (2013.01); *H02K 9/16* (2013.01); *H02K 9/19* (2013.01); *H02K 15/14* (2013.01)

(58) Field of Classification Search
CPC ........... H02K 5/20; H02K 9/19; H02K 15/14; H02K 9/197; H02K 1/12; H02K 5/203;
(Continued)

(56) References Cited

U.S. PATENT DOCUMENTS 9,065,312 B2 * 6/2015 Fernandes Goncalves ................. H02K 5/203
9,825,503 B2 * 11/2017 Hyun ...................... H02K 5/203
(Continued)

FOREIGN PATENT DOCUMENTS

DE 102018207842 A1 11/2019
DE 102018117774 A1 1/2020
(Continued)

OTHER PUBLICATIONS

DE 102018207842 A1 (Year: 2019).*
(Continued)

*Primary Examiner* — Alexander A Singh
(74) *Attorney, Agent, or Firm* — LEYDIG, VOIT & MAYER, LTD.

(57) ABSTRACT

A stator cooling housing for a stator of a rotary electric motor includes a cylindrical frame adapted to be mounted around an iron core and having an outer lateral surface and inlet and outlet channels. A cylindrical jacket is arranged against the outer lateral surface of the cylindrical frame. The cylindrical jacket comprises an inner side having a plurality of cylindrical grooves forming with the outer lateral surface of the cylindrical frame adjacent fluid cooling channels arranged around the cylindrical frame from a frame upper portion to a frame lower portion. Fluid communication portions are arranged such that a cooling fluid is enabled to run from the inlet channel, through the adjacent fluid cooling channels from the frame upper portion to the frame lower portion, and through the outlet channel to form a cooling circuit.

15 Claims, 4 Drawing Sheets

(51) Int. Cl.
*H02K 9/16* (2006.01)
*H02K 9/19* (2006.01)
*H02K 15/14* (2006.01)

(58) Field of Classification Search
CPC .............. H02K 9/00; H02K 9/02; H02K 9/04;
H02K 9/06; H02K 9/08; H02K 9/10;
H02K 9/12; H02K 9/14; H02K 9/16;
H02K 9/18; H02K 9/193; H02K 9/22
USPC ........ 310/52, 54, 57, 58, 59, 60 R, 60 A, 64
See application file for complete search history.

(56) References Cited

U.S. PATENT DOCUMENTS

2013/0342047 A1* 12/2013 Fernandes Goncalves ................
H02K 5/203
310/54
2014/0091652 A1* 4/2014 Dragon .................. H02K 5/203
310/59
2015/0048700 A1* 2/2015 Liu ........................ H02K 5/203
310/54
2019/0052146 A1* 2/2019 Decaux ............. H05K 7/20927

FOREIGN PATENT DOCUMENTS

| | | |
|---|---|---|
| EP | 2680408 A1 | 1/2014 |
| EP | 3553922 A1 | 10/2019 |
| EP | 3996255 A1 | 5/2022 |
| FR | 3049403 A1 | 9/2017 |
| JP | 2007143247 A | 6/2007 |
| KR | 101547580 B1 * | 8/2015 |

OTHER PUBLICATIONS

DE 102015006348 A1 (Year: 2015).*
EP 3480929 A1 (Year: 2019).*
FR 3049403 A1 (Year: 2017).*
EP 3553922 A1 (Year: 2019).*
Lim et al, Apparatus for Cooling Motor, Aug. 27, 2015, KR 101547580 (English Machine Translation) (Year: 2015).*

* cited by examiner

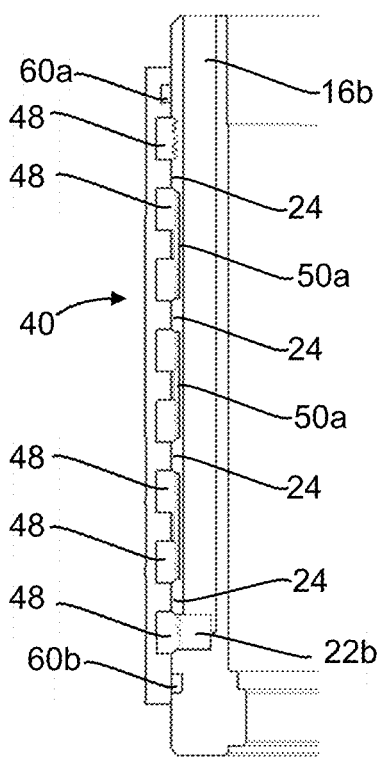
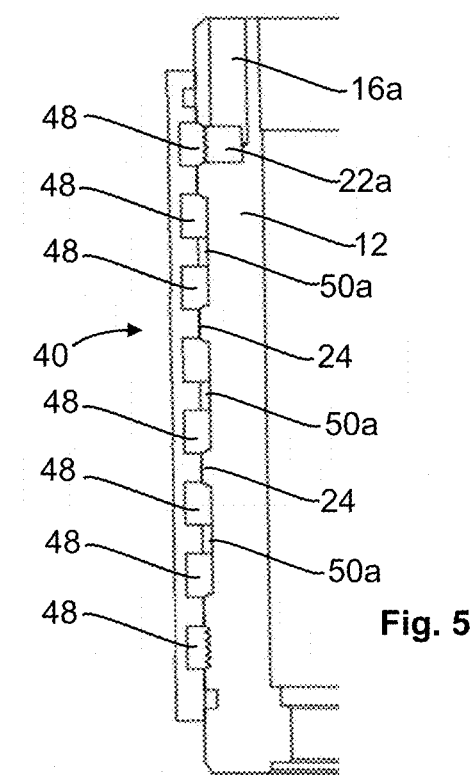
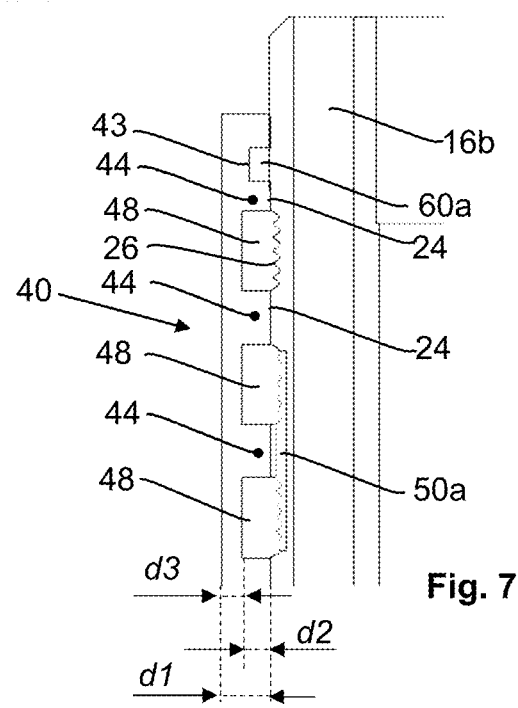

STATOR COOLING HOUSING FOR A STATOR OF A ROTARY ELECTRIC MOTOR

CROSS REFERENCE TO PRIOR APPLICATION

This application claims benefit to European Patent Application No. EP 20213038.1, filed on Dec. 10, 2020, which is hereby incorporated by reference herein.

FIELD

The present invention relates to a stator cooling housing for a stator of a rotary electric motor, to a stator comprising the stator cooling housing and to a rotary electric motor comprising such stator. The invention also relates to a method for manufacturing the stator cooling housing.

BACKGROUND

Many solutions for cooling a stator of a rotary electric motor already exist.

EP2680408, for example, discloses a cylindrical frame for enclosing and cooling an iron core of a rotary electrical motor. The cylindrical frame comprises two bundles of cooling ducts arranged on an outer lateral surface of the cylindrical frame. One of the bundles of cooling ducts guides cooling fluid from a coolant intake around circumference of the cylindrical frame. Coolant ducts, a reversal region and an outlet region are sealed by a cylindrical jacket that rests against an outer lateral surface of the frame. The jacket includes a slot arranged between the bundles of cooling ducts and between an intake region and the outlet region and is welded to the frame along the slot.

FIGS. 1a and 1b of European patent application n° 20205752.7, which is a 54(3) EPC prior art document, show portions of a cylindrical frame for cooling an iron core of a stator of a rotary electric motor. Grooves are provided on an outer surface of a cylindrical frame to form fluid cooling channels A with a cylindrical jacket B press-fitted around the cylindrical frame. The jacket B must however be thick enough to be sufficiently resistant to avoid any bulging of the jacket due to the high pressure prevailing in the fluid cooling channels when the rotary electric motor is operating.

The thickness of the jacket has however a negative impact on the overall footprint of the rotary electric motor.

SUMMARY

In an embodiment, the present disclosure provides a stator cooling housing for a stator of a rotary electric motor. A cylindrical frame is adapted to be mounted around an iron core, and has an outer lateral surface and inlet and outlet channels. A cylindrical jacket is arranged against the outer lateral surface of the cylindrical frame. The cylindrical jacket comprises an inner side having a plurality of cylindrical grooves forming with the outer lateral surface of the cylindrical frame adjacent fluid cooling channels arranged around the cylindrical frame from a frame upper portion to a frame lower portion. Fluid communication portions are arranged such that a cooling fluid is enabled to run from the inlet channel, through the adjacent fluid cooling channels from the frame upper portion to the frame lower portion, and through the outlet channel to form a cooling circuit

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 1b shows a close-up view of the upper portion of FIG. 1a;

FIG. 5 shows a cross-sectional view of FIG. 4 taken along an inlet channel of a cooling circuit;

FIG. 6 shows a cross-sectional view of FIG. 4 taken along an outlet channel of the cooling circuit;

FIG. 7 shows a close-up view of the upper portion of FIG. 6;

DETAILED DESCRIPTION

Figure 1A:
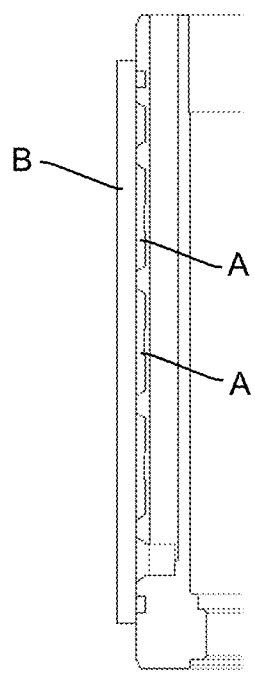
FIG. 1a shows cross-sectional view of the stator cooling housing according to a prior art.

Embodiments of the present invention provide a stator cooling housing with an improved ratio between its overall magnetic performance and its footprint.

In the same or in other embodiments, the present invention provides a stator cooling housing that is easy to manufacture and therefore cost-effective.

A stator cooling housing with an improved ratio between its overall magnetic performance and its footprint, the stator housing also being easy to manufacture and therefore cost-effective, is achieved by a stator cooling housing for a stator of a rotary electric motor according to an embodiment of the present invention. The stator cooling housing comprises a cylindrical frame adapted to be mounted around an iron core and a cylindrical jacket. The cylindrical frame comprises inlet and outlet channels and an outer lateral surface against and around which the cylindrical jacket is mounted, for example by a press-fit operation. The cylindrical jacket comprises an inner side provided with a plurality of cylindrical grooves forming, with the outer lateral surface of the cylindrical frame, adjacent fluid cooling channels arranged around the cylindrical frame from a frame upper portion to a frame lower portion. The stator cooling housing further comprises fluid communication portions arranged such that a cooling fluid may run from the inlet channel, through the fluid cooling channels, from the frame upper portion to the frame lower portion, and through the outlet channel to form a cooling circuit.

In an embodiment, the fluid communication portions are arranged such that the cooling fluid may run from an upper to a lower cooling channel of any adjacent cooling channels.

In an embodiment, the stator cooling housing comprises a first and a second set of fluid communication portions arranged to bring adjacent cooling channels in fluid communications. The respective median height of each fluid communication portion of the first set is offset with respect to the respective median height of the corresponding fluid communication portion of the second set.

In an embodiment, the offset corresponds substantially to the height of one cooling channel plus the height of one jacket cylindrical resting surface.

In an embodiment, the first and second sets of fluid communication portions are aligned one under the other along the height of the cylindrical frame respectively at a first and at a second angle position.

In an embodiment, the first and second sets of fluid communication portions are diametrically opposed.

In an embodiment, each fluid communication portion of the first and second sets comprises a flat surface.

In an embodiment, the cylindrical jacket comprises cylindrical extensions forming therebetween the plurality of grooves. The outer lateral surface of the cylindrical frame comprises jacket cylindrical resting surfaces against which rest respective cylindrical extensions of the cylindrical jacket.

In an embodiment, the total thickness of the jacket comprises a functionalized portion having the plurality of grooves, and a non-functionalized portion having a thickness which is less than half of the total thickness of the jacket.

In an embodiment, several sets of adjacent fins are arranged between the jacket cylindrical resting surfaces so that each set of adjacent fins is positioned inside respective fluid cooling channels.

In an embodiment, upper and lower sealing rings are mounted on an upper, respectively a lower portion of the stator cooling housing. One of the first and second sealing rings is mounted inside a cylindrical groove located on the outer surface of the cylindrical frame while the other of the first and second sealing rings is mounted inside a cylindrical groove of the cylindrical jacket.

Another embodiment of the invention relates to a stator for a rotary electric motor comprising the stator cooling housing as described above.

A further embodiment of the invention relates to a rotary electric motor comprising the above stator.

Another further embodiment of the invention relates to a method of manufacturing a stator cooling housing. The method comprises:
   machining a blank of a cylindrical frame, adapted to mounted around an iron core, by means of a lathe, to form several sets of adjacent fins between cylindrical surfaces extending around an outer lateral surface of the cylindrical frame;
   machining, on a first portion of the outer lateral surface of the cylindrical frame, a first set of flat surfaces such that each of two opposite sides of each flat surface is aligned with two adjacent sets of fins and such that these flat surfaces are aligned one under the other along the height of the cylindrical frame,
   machining on a second portion of the outer surface of the cylindrical frame, which is preferably diametrically opposed to the first portion, a second set of flat surfaces such that each of two opposite sides of each flat surface is aligned with two adjacent sets of fins and such that these flat surfaces are aligned one under the other along the height of the cylindrical frame and are offset with respect to the flat surfaces of the first set;
   machining a portion of the cylindrical frame to form an inlet channel extending from an upper surface of the frame to the uppermost set of adjacent fins and an outlet channel extending from the upper surface of the frame to the lowermost set of adjacent fins;
   machining an inlet recess in the uppermost set of adjacent fins to bring the inlet channel in fluid communication with the inlet recess,
   machining an outlet recess in the lowermost set of adjacent fins to bring the outlet channel in fluid communication with the outlet recess,
   machining a blank of a cylindrical jacket, by means of a lathe, to form adjacent cylindrical grooves on an inner side of the jacket to produce a cylindrical jacket, and
   mounting the cylindrical jacket against and around the outer lateral surface of the cylindrical frame to form fluid cooling channels in fluid communication with the inlet and outlet channels.

In an embodiment, before the step of mounting the cylindrical jacket, a first sealing ring is mounted inside an upper groove of the cylindrical jacket and a second sealing ring is mounted inside a cylindrical groove located on a lower portion of the outer surface of the cylindrical frame.

Figure 2:
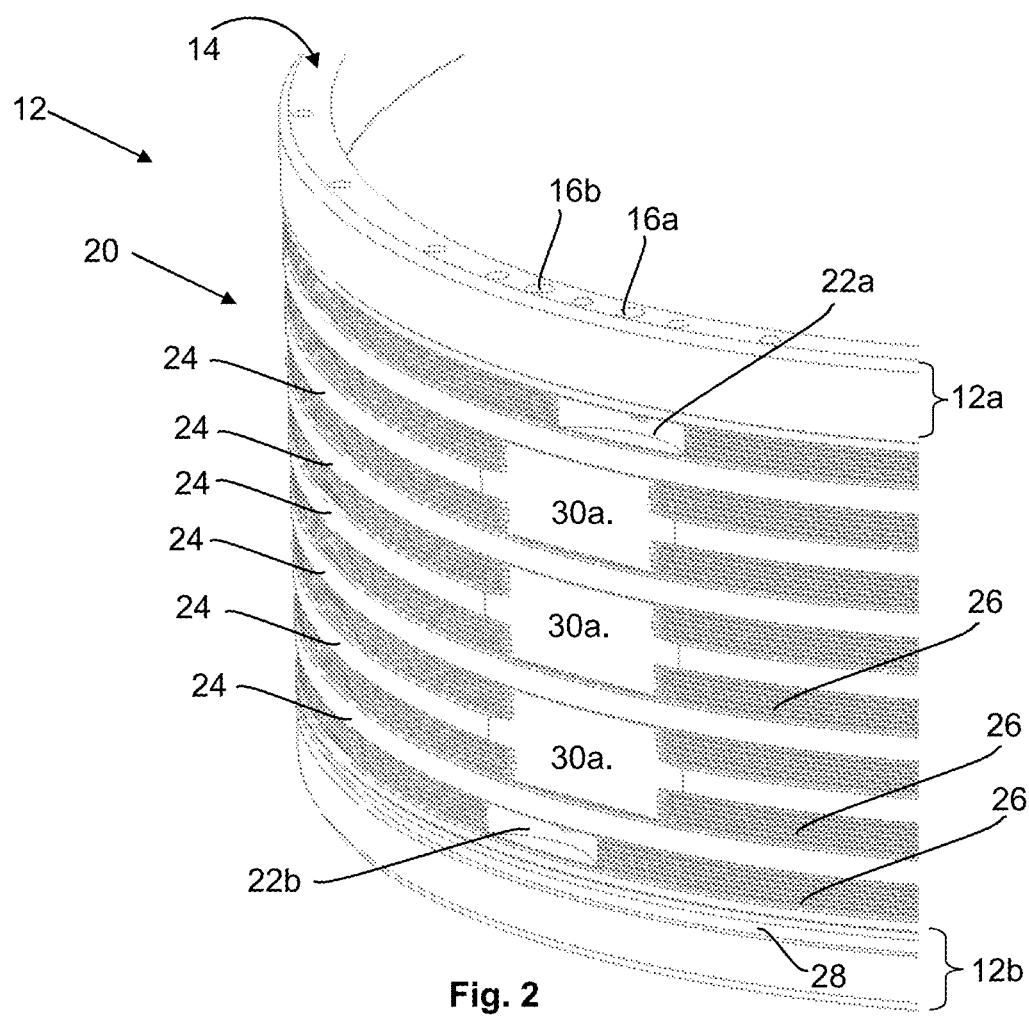
FIG. 2 shows a perspective view of a portion of a cylindrical frame adapted to receive around its outer lateral surface a cylindrical jacket according to an embodiment of the invention.

FIG. 2 shows a cylindrical frame 12 according to an embodiment of the invention. The cylindrical frame 12 is in metal, preferably in steel, and is adapted to be mounted around an iron core of a stator. The cylindrical frame 12 comprises an outer lateral surface 20 which has been machined by means of a lathe to form a plurality of sets of adjacent cylindrical fins 26 disposed between corresponding jacket cylindrical resting surfaces 24. A cylindrical jacket 40 is mounted around the frame outer lateral surface, for example by a press-fit operation, to obtain the stator cooling housing 10. In this embodiment, there are eight sets of adjacent cylindrical fins 26 separated by seven jacket cylindrical resting surfaces 24 although the number of sets of adjacent fins and resting surfaces may vary according to other embodiments.

Figure 8:
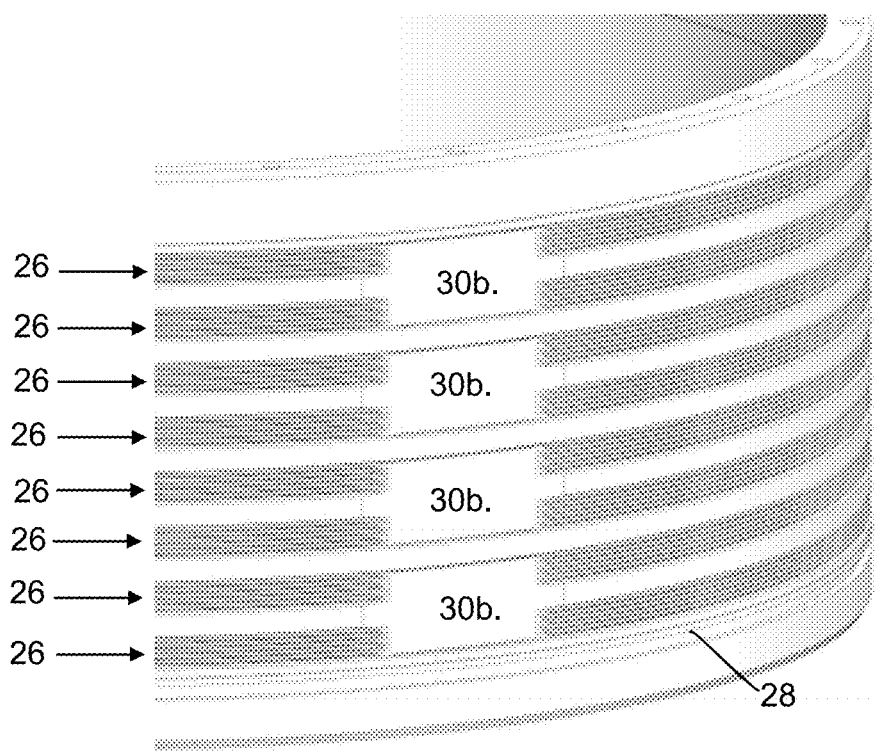
FIG. 8 shows a perspective view of a portion of the cylindrical frame which is diametrically opposed to the portion illustrated in FIG. 2.
Figure 9:
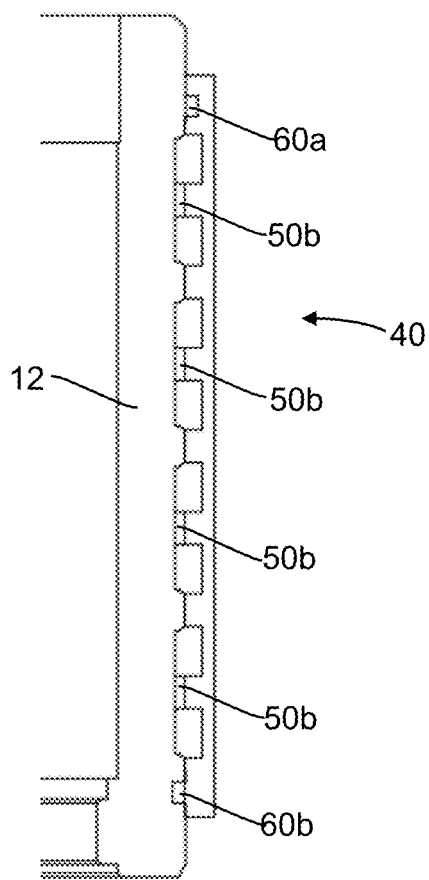
FIG. 9 shows a cross-sectional view of FIG. 4 taken along fluid communication portions of the cylindrical frame as illustrated in FIG. 8.

Referring to FIGS. 2 and 8, a first and a second set of flat surfaces 30a, 30b have been milled on the outer surface 20 of the cylindrical frame 12 such that flat surfaces 30a, 30b of each set are aligned one under the other along the height of the cylindrical frame 12. The first set of flat surfaces 30a is preferably arranged in a diametrically opposed fashion on the frame lateral outer surface 20 with respect to the second set of flat surfaces 30b.

Figure 3:
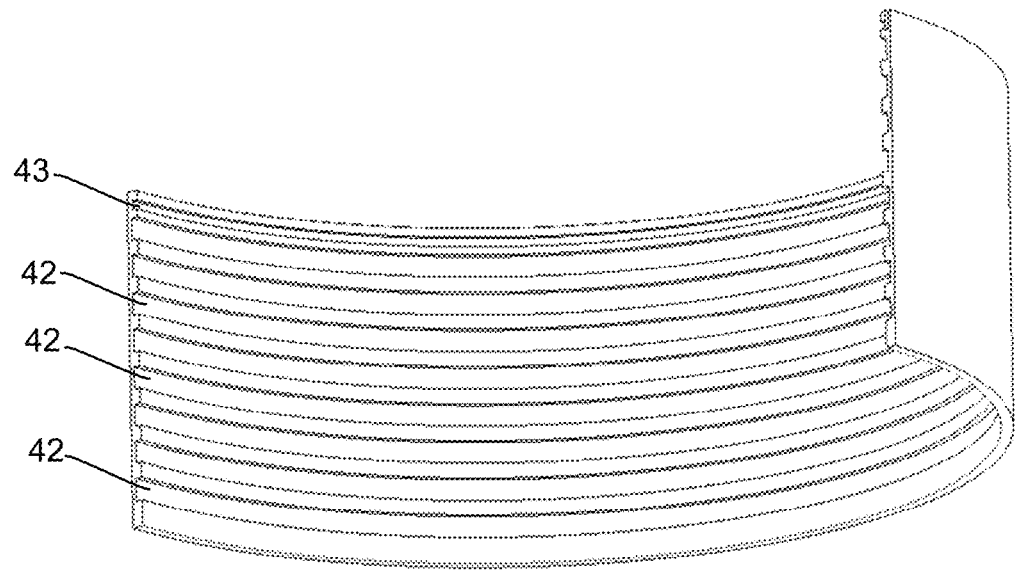
FIG. 3 shows a perspective view of a portion of the cylindrical jacket from its inner side.
Figure 4:
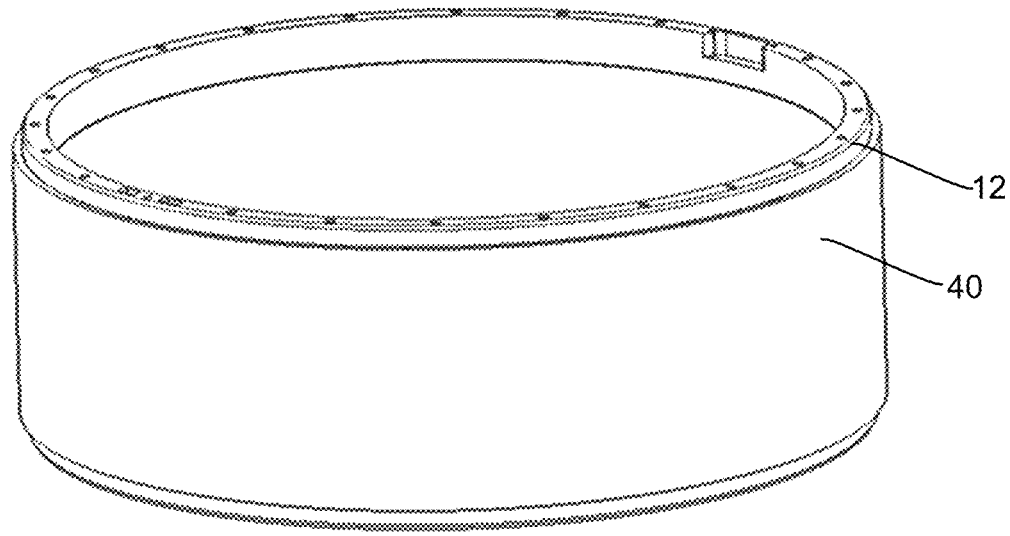
FIG. 4 shows a stator cooling housing with the cylindrical jacket press-fitted around and against the outer surface of the cylindrical frame.

A blank of a cylindrical jacket is machined by means of a lathe to form adjacent cylindrical grooves 42 on its inner side, as shown in FIG. 3, to obtain the cylindrical jacket 40. This cylindrical jacket 40 is mounted around and against the frame outer lateral surface 20 to form fluid cooling channels 48 as illustrated in FIGS. 5 to 7 and 9 in fluid communication by respective fluid communication portions 50 to form a cooling circuit. To this effect, the respective median height of each flat surfaces 30a of the first set is offset with respect to the respective median height of each flat surface 30b of the second set to bring in fluid communication adjacent fluid cooling channels 48 through corresponding fluid communication portion 50 such that a cooling fluid may run from the uppermost to the lowermost cooling channel as described in detail subsequently. The offset corresponds for example to the height of a cooling channel 48 plus the width of an adjacent jacket cylindrical resting surface 24.

Referring particularly to FIG. 7, the inner side of the cylindrical jacket 40 comprises cylindrical extensions 44 mounted against corresponding cylindrical resting surfaces 24 of the cylindrical frame 12 such that each set of adjacent cylindrical fins 26 are positioned inside a corresponding fluid cooling channel 48 to increase thermal exchange with the cooling fluid for an efficient reduction of the heat generated by the stator coils.

As shown in FIG. 5, the cylindrical frame 12 comprises an inlet channel 16 extending from an upper cylindrical surface 14 (FIG. 2) of the frame 12, through a frame upper portion 12a and leading into an inlet recess 22a located between an uppermost set of adjacent fins 26 extending from both sides of the inlet recess 22a through approximately between 160° to 170° to respective opposite sides of the uppermost flat surface 30b which is diametrically opposed to the inlet recess 22a as it can be seen in FIG. 8.

Referring to FIGS. 6 and 7, the cylindrical frame 12 comprises an outlet channel 16b extending from the upper cylindrical surface 14 of the frame 12, through most of the height of the frame 12 and leading into an outlet recess 22b located between a lowermost set of adjacent fins 26 extending from both sides of the outlet recess 22b through approximately between 160° to 170° to respective opposite sides of the lowermost flat surface 30b (FIG. 8) which is preferably diametrically opposed to the outlet recess 22b.

Under cooling operation, a cooling fluid runs through the inlet channel 16a, into the first inlet recess 22a, whereupon the cooling fluid separates to run through the uppermost cooling channel 48 in clockwise and counterclockwise directions spanning approximately 180°. The cooling fluid then runs through a fluid communication portion 50b of the second set of fluid communication portions 50a, 50b, into a lower cooling channel 48 in clockwise and counterclockwise directions spanning approximately 180° until it reaches another fluid communication portion 50a of the first set of fluid communication portions 50a, 50b. The cooling fluid then runs into a lower cooling channel 48 and so on until it reaches the outlet recess 22b, whereupon the cooling fluid is sucked in an upward direction along the outlet channel 16b. The cooling fluid therefore runs along clockwise and counterclockwise circular paths around the outer lateral surface 20 of the cylindrical frame 12.

With reference to FIG. 7, the total thickness d1 of the cylindrical jacket comprises a functionalized portion of a first thickness d2 and a non-functionalized portion of a second thickness d3 forming together the total thickness of the jacket d1. The functionalized portion comprises the adjacent grooves 42 forming the fluid cooling channels 48 with the corresponding sets of adjacent cylindrical fins 26, and the cylindrical extensions 44 which bring rigidity of the cylindrical jacket 40 which permits the non-functionalized portion to withstand the pressure exerted outwardly by the cooling fluid, thereby avoiding any bulging on the jacket.

Figure 1B:
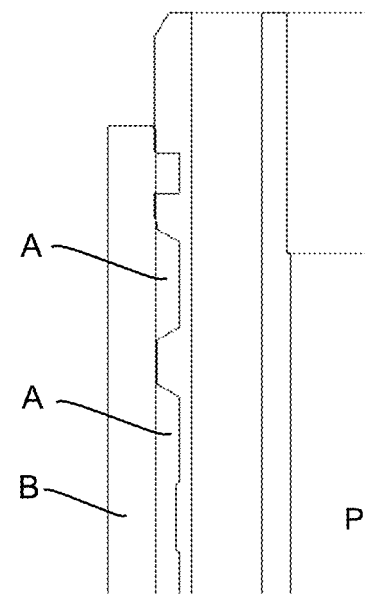

Integrating the adjacent grooves 42 in the inner side of the cylindrical jacket 40 rather than on the frame outer lateral surface 20, as shown in FIGS. 1a and 1b, allows to reduce the thickness of the non-functionalized portion, thereby reducing the external diameter of the stator cooling housing 10 in comparison with a stator cooling housing using the cooling arrangement of FIGS. 1a and 1b.

The jacket 40 is heated and press-fitted and sealed around the cylindrical frame 12. To that effect, an upper sealing ring 60a is fitted inside an uppermost sealing groove 43 of the cylindrical jacket 40 and presses against the frame upper portion 12a. The frame lower portion 12a comprises a cylindrical groove 28 inside which is fitted a lower sealing ring 60b which presses against a lower portion of the cylindrical jacket. The upper and lower sealing rings may be for example O-rings.

The upper sealing ring 60a is arranged on the uppermost sealing groove 43 of the jacket rather than around the frame upper portion 12a because of the lack of space in the frame upper portion 12a to accommodate a cylindrical groove due to the presence of the inlet and outlet channels 16a, 16b. The lower sealing ring 60b is arranged on the frame lower portion 12b rather than inside the lowermost groove of the cylindrical jacket to protect the lower sealing ring 60b during the press-fit operation. More particularly, the lower sealing arrangement advantageously avoids the sealing ring 60b to rub against the outer surface 20 of the frame 12 when the lower edge of the cylindrical jacket 40 is brought from the frame upper portion 12a to the frame lower portion 12b during the press-fit operation.

Various modifications and variations to the described embodiments of the invention will be apparent to those skilled in the art without departing from the scope of the invention as defined in the appended claims. For example, the plurality of cylindrical adjacent fins provided on the outer surface of the frame may be replaced by corresponding cylindrical flat surface although the thermal exchange would be less effective according to this embodiment, resulting in lower reduction of the heat generated by the coils. In addition, the first and second sets of flat surfaces 30a, 30b may positioned differently and are therefore not necessarily aligned and positioned in a diametrically opposed fashion as disclosed in the above described embodiment.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE LIST

Stator cooling housing 10
    Cylindrical frame 12
        Frame upper and lower portion 12a, 12b
        Upper cylindrical surface 14
            Inlet and outlet channels 16a, 16b
        Outer lateral surface 20
            Inlet an outlet recesses 22a, 22b
            Jacket cylindrical resting surfaces 24
            Sets of adjacent cylindrical fins 26

Cylindrical groove 28
  First and second set of flat surface 30a, 30b
Cylindrical jacket 40
  Cylindrical grooves 42
  Sealing groove 43
  Cylindrical extensions 44
  Jacket total thickness d1
  Functionalized jacket thickness d2
  Non-functionalized jacket thickness d3
Fluid cooling channels 48
First and second sets of fluid communication portions 50a, 50b
Upper and lower sealing rings 60a, 60b
  O-rings

What is claimed is:

1. A stator cooling housing for a stator of a rotary electric motor, the stator cooling housing comprising:
  a cylindrical frame adapted to be mounted around an iron core and having an outer lateral surface and inlet and outlet channels;
  a cylindrical jacket arranged against the outer lateral surface of the cylindrical frame, wherein the cylindrical jacket comprises an inner side having a plurality of cylindrical grooves forming with the outer lateral surface of the cylindrical frame adjacent fluid cooling channels arranged around the cylindrical frame from a frame upper portion to a frame lower portion; and
  fluid communication portions arranged such that a cooling fluid is enabled to run from the inlet channel, through the adjacent fluid cooling channels from the frame upper portion to the frame lower portion, and through the outlet channel to form a cooling circuit,
  wherein each of the fluid communication portions comprises a flat surface machined into the outer lateral surface of the cylindrical frame, the flat surfaces being disposed opposite to the inner side of the cylindrical jacket.

2. The stator cooling housing according to claim 1, wherein the fluid communication portions are arranged such that the cooling fluid is enabled to run from an upper to a lower cooling channel of any of the adjacent cooling channels.

3. The stator cooling housing according to claim 1, wherein the fluid communication portions comprise a first and a second set of fluid communication portions arranged to bring the adjacent cooling channels in fluid communications, and wherein a respective median height of each fluid communication portion of the first set is offset with respect to a respective median height of a corresponding fluid communication portion of the second set.

4. The stator cooling housing according to claim 3, wherein the offset corresponds substantially to a height of one of the adjacent fluid cooling channels plus a width of a jacket cylindrical resting surface arranged at the outer lateral surface of the cylindrical frame.

5. The stator cooling housing according to claim 3, wherein the first set of fluid communication portions are aligned one under the other along a height of the cylindrical frame at a first angle position along a circumference of the cylindrical frame, and the second set of fluid communication portions are aligned one under the other along the height of the cylindrical frame at a second angle position along the circumference of the cylindrical frame.

6. The stator cooling housing according to claim 5, wherein the first and second sets of fluid communication portions are diametrically opposed.

7. The stator cooling housing according to claim 1, wherein the cylindrical jacket comprises cylindrical extensions forming therebetween the plurality of grooves, the cylindrical extensions resting against respective jacket cylindrical resting surfaces arranged at the outer lateral surface of the cylindrical frame.

8. The stator cooling housing according to claim 7, wherein a total thickness of the cylindrical jacket comprises a functionalized portion comprising the plurality of grooves, and a non-functionalized portion having a thickness which is less than half of the total thickness of the cylindrical jacket.

9. The stator cooling housing according claim 7, wherein several sets of adjacent fins are arranged between the jacket cylindrical resting surfaces so that each of the sets of adjacent fins is positioned inside a respective one of the adjacent fluid cooling channels.

10. The stator cooling housing according to claim 7, wherein the flat surfaces at each end, in a direction of a circumference of the cylindrical frame, intersect with a curved outer surface of the jacket cylindrical resting surfaces.

11. The stator cooling housing according to claim 1, further comprising upper and lower sealing rings mounted respectively on upper and lower portions of the stator cooling housing, wherein one of the first and second sealing rings is mounted on a cylindrical groove located on the outer lateral surface of the cylindrical frame and the other of the first and second sealing rings is mounted on a cylindrical groove of the cylindrical jacket.

12. A method of manufacturing the stator cooling housing according to claim 1, the method comprising:
  machining, by a lathe, a blank of the cylindrical frame, adapted to be mounted around the iron core, to form several sets of adjacent fins between cylindrical surfaces extending around an outer lateral surface of the cylindrical frame;
  machining, on a first portion of the outer lateral surface of the cylindrical frame, a first set of flat surfaces such that each of two opposite sides of each of the flat surfaces of the first set is aligned with two adjacent ones of the several sets of the adjacent fins and such that the flat surfaces of the first set are aligned one under the other along a height of the cylindrical frame;
  machining, on a second portion of the outer lateral surface of the cylindrical frame, a second set of flat surfaces such that each of two opposite sides of each of the flat surfaces of the second set is aligned with two adjacent ones of the several sets of the adjacent fins and such that the flat surfaces of the second set are aligned one under the other along the height of the cylindrical frame and are offset with respect to the flat surfaces of the first set;
  machining a portion of the cylindrical frame to form the inlet channel extending from an upper cylindrical surface of the frame to an uppermost one of the sets of the adjacent fins and the outlet channel extending from the upper surface of the frame to a lowermost one of the sets of the adjacent fins;
  machining an inlet recess in the uppermost set of the adjacent fins to bring the inlet channel in fluid communication with the inlet recess;

machining an outlet recess in the lowermost set of the adjacent fins to bring the outlet channel in fluid communication with the outlet recess;

machining, by a lathe, a blank of the cylindrical jacket to form the adjacent cylindrical grooves on the inner side of the blank of the cylindrical jacket to produce the cylindrical jacket; and mounting the cylindrical jacket against the outer lateral surface of the cylindrical frame to form the fluid cooling channels in fluid communication with the inlet and outlet channels.

13. The method according to claim 12, wherein, before the step of mounting the cylindrical jacket, a first sealing ring is mounted inside an upper groove of the cylindrical jacket and a second sealing ring is mounted inside a cylindrical groove located on a lower portion of the outer lateral surface of the cylindrical frame.

14. The method according to claim 12, wherein the second portion of the outer lateral surface of the cylindrical frame is diametrically opposed the first portion of the outer lateral surface of the cylindrical frame.

15. A rotary electric motor comprising:
a stator; and
a stator cooling housing comprising:
a cylindrical frame adapted to be mounted around an iron core and having an outer lateral surface and inlet and outlet channels;
a cylindrical jacket arranged against the outer lateral surface of the cylindrical frame, wherein the cylindrical jacket comprises an inner side having a plurality of cylindrical grooves forming with the outer lateral surface of the cylindrical frame adjacent fluid cooling channels arranged around the cylindrical frame from a frame upper portion to a frame lower portion; and
fluid communication portions arranged such that a cooling fluid is enabled to run from the inlet channel, through the adjacent fluid cooling channels from the frame upper portion to the frame lower portion, and through the outlet channel to form a cooling circuit,
wherein each of the fluid communication portions comprises a flat surface machined into the outer lateral surface of the cylindrical frame, the flat surfaces being disposed opposite to the inner side of the cylindrical jacket.

* * * * *